(12) United States Patent  
Jones (10) Patent No.: US 11,968,660 B2
(45) Date of Patent: Apr. 23, 2024

(54) OPTIMIZING LICENSED AND UNLICENSED SPECTRUM ALLOCATION

(71) Applicant: T-Mobile USA, Inc., Bellevue, WA (US)

(72) Inventor: David Jones, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 199 days.

(21) Appl. No.: 17/017,530

(22) Filed: Sep. 10, 2020

(65) Prior Publication Data

US 2021/0185705 A1 Jun. 17, 2021

Related U.S. Application Data

(60) Provisional application No. 62/948,713, filed on Dec. 16, 2019.

(51) Int. Cl.
*H04W 72/12* (2023.01)
*H04W 72/1263* (2023.01)
*H04W 72/20* (2023.01)

(52) U.S. Cl.
CPC ....... *H04W 72/1263* (2013.01); *H04W 72/20* (2023.01)

(58) Field of Classification Search
CPC ..... H04W 16/04; H04W 16/14; H04W 16/18; H04W 72/048; H04W 72/08; H04W 72/1263; H04W 72/1278
See application file for complete search history.

(56) References Cited

U.S. PATENT DOCUMENTS

| 2012/0034944 A1* | 2/2012 | Olexa | H04B 7/12 455/513 |
| 2014/0211619 A1* | 7/2014 | Suryavanshi | H04L 47/2425 370/230 |
| 2021/0211887 A1* | 7/2021 | Jones | H04W 28/06 |
| 2023/0074288 A1* | 3/2023 | Filippou | H04W 28/0236 |

FOREIGN PATENT DOCUMENTS

| WO | 2015172740 A1 | 11/2015 | |
| WO | WO-2015172740 A1 * | 11/2015 | ........... H04B 1/0003 |
| WO | 2020117474 A1 | 6/2020 | |

OTHER PUBLICATIONS

Smoothing, entry of Wikipedia, available at https://en.wikipedia.org/w/index.php?title=Smoothing&oldid=926155747 published Nov. 14, 2019 (Year: 2019).*

(Continued)

*Primary Examiner* — Khaled M Kassim
*Assistant Examiner* — Zhaohui Yang (57) ABSTRACT

This disclosure describes techniques that enable optimizing licensed and unlicensed spectrum allocation within a service area of a base station node. More specifically, a spectrum allocation controller is described that is configured to identify, within a service area of a base station node, one or more available spectrum to facilitate the transmission of network traffic within the service area. The spectrum allocation controller may further determine network traffic that occurs in non-overlapping segments of the service area. In this way, network traffic within each segment may be allocated to a combination of available spectrum.

20 Claims, 6 Drawing Sheets

(56) References Cited

OTHER PUBLICATIONS

European Patent Application No. 20214025.7, Partial Search Report dated May 7, 2021, 12 pages.
Canadian Patent Application No. 3,102,003, Examiner's Search Report dated Nov. 17, 2021, 4 pages.
European Patent Application No. 20214025.7, Search Report dated Aug. 10, 2021, 12 pages.
Canadian Patent Application No. 3,102,003, Office Action dated Sep. 7, 2022, 4 pages.
European Patent Application No. 20214025.7, Office Action dated Apr. 25, 2023, 6 pages.

* cited by examiner

OPTIMIZING LICENSED AND UNLICENSED SPECTRUM ALLOCATION

RELATED APPLICATIONS

This application claims priority to commonly owned U.S. Provisional Patent Application No. 62/948,713, filed on Dec. 16, 2019, titled "Schedule Optimization for Allocation, Balancing, and Aggregation Between Primary, CBRS, and Unlicensed Spectrum," which is herein incorporated by reference in its entirety.

BACKGROUND

Present-day, the primary radio frequency (RF) band spectrum of a telecommunication network is configured to support network traffic within a service area of a base station node. The primary licensed RF band spectrum may include Long-Term Evolution (LTE) air-interface technology or 5G-New Radio (5G-NR) air-interface technology and is used to support guaranteed bit rate (GBR) communications and best effort communications. At times, network traffic (i.e. GBR and best-effort communications) within a service area may overwhelm available network resources, and as such cause a deterioration in the quality of service (QoS) through an increase in packet loss, jitter, echo, and latency.

Therefore, it is desirable for a telecommunication network to spread network traffic that is typically carried by the primary licensed RF band spectrum across additional available spectrum resources. While additional spectrum resources, such as unlicensed spectrum and citizen broadband radio service spectrum (CBRS), are available to telecommunication networks, current technologies lack an efficient mechanism to make use of such spectrum to relieve real-time network traffic within a service area of a base station node.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques for optimizing the provisioning licensed and unlicensed spectrum. The primary radio frequency (RF) band spectrum, such as Long-Term Evolution (LTE) or 5G-New Radio (5G-NR), can be expensive when used as the sole spectrum to support network traffic within a service area. Aside from the expense, at times, service areas may experience peaks in network traffic, causing network congestion. Service providers may deal with network congestion by making additional spectrum available to accommodate network peaks, or by reducing the service expectations, which is a Quality of Service (QoS) associated with the network traffic.

This disclosure describes a spectrum allocation controller that is configured to provide a licensed and unlicensed spectrum within a service area of the base station node. More specifically, the spectrum allocation controller analyzes current network traffic within a service area, and in doing so, allocates licensed and unlicensed spectrum to segments of the service area, based on the capability of the allocated spectrum and the needs of each service segment.

For example, an unlicensed spectrum, governed by the License Assisted Access (LAA), operates within the 5 GHz bands and provides relatively higher bandwidth but lower geographic coverage (i.e. higher signal attenuation) when compared to primary low or mid-band licensed RF band spectrum. The higher bandwidth translates to improved data throughput and bit rates, which in term reduces packet loss, jitter, and latency issues and thus improve user experience. However, the relatively low geographic coverage means that the benefit of the unlicensed spectrum is restricted to segments near, or substantially near, to the licensed spectrum transceiver.

With those operational parameters in mind, the spectrum allocation controller may allocate an unlicensed spectrum to network traffic within a service segment that is near the base station node (i.e. unlicensed spectrum transceiver). Allocation of the unlicensed spectrum may be selective, in that only high data throughput traffic is allocated unlicensed spectrum. High data throughput is assessed relative to nominal data throughput capabilities of the primary licensed RF band spectrum.

Similarly, the spectrum allocation controller may leverage the use of a licensed spectrum based on the spectrum's capability and the needs of the service area. Licensed spectrum may include the primary licensed RF band spectrum, such as LTE and 5G-NR, and Citizens Broadband Radio Service Spectrum (CBRS). Unlike the primary licensed RF band spectrum, the CBRS spectrum is governed by the Spectrum Access System (SAS) and operates within the 3.50 GHz band. The CBRS spectrum provides higher bandwidth but less geographic coverage relative to the primary licensed RF band spectrum. Therefore, to accommodate its lesser geographic coverage, the use of the CBRS spectrum may be beneficial within service segments closer to the base station node relative to service segments served by a primary licensed RF band spectrum.

Additionally, the CBRS spectrum provides an improved geographic coverage (i.e. lower signal attenuation over a given distance) but less bandwidth relative to unlicensed spectrum. Therefore, the spectrum allocation controller may allocate the CBRS spectrum to network traffic within service segments immediately outward of initial service segments provisioned by an unlicensed spectrum. In this way, network traffic at a service edge of an initial service segment may switch from an unlicensed spectrum to the CBRS spectrum to avoid a QoS deterioration due to signal attenuation of the unlicensed spectrum.

It is noteworthy that the CBRS spectrum is currently being used by the United States government for radar systems and is only made available to telecommunication service providers if the spectrum is not being used by government entities, for government purposes. The radio interface for the CBRS spectrum can be the same as LTE in the licensed spectrum and on the 5 GHz band in the unlicensed spectrum. The difference between the CBRS spectrum and the primary licensed RF band spectrum is in the spectrum assignment. U.S. Naval Radar, Department of Defense (DoD) personnel along with registered sites for site-specific protection, all have standing priority to access the CBRS spectrum. Therefore, to make use of the CBRS spectrum, a service provider is required to request a spectrum allocation, and in doing so, is assigned a band by the SAS. The SAS calculates the RF density and channel availability using terrain and radio propagation data before assigning a CBRS spectrum to a requesting service provider. An allocation of the CBRS spectrum is time limited. Therefore, service providers are required to continually request a CBRS band allocation upon the expiration of the previous allocation.

With that in mind, the spectrum allocation controller may make use of the CBRS spectrum after determining its availability at each time of use. In other words, prior to each allocation of spectrum within the service area of a base station node, the spectrum allocation controller may determine the availability of licensed and unlicensed spectrum, which includes the CBRS spectrum.

Moreover, the spectrum allocation controller may provision the primary licensed RF band spectrum for service areas that remain unserved by the unlicensed spectrum and CBRS spectrum, if available. In one example, the spectrum allocation controller may allocate the primary licensed RF band spectrum to network traffic within a service segment that is immediately outward and adjacent to the service segment provisioned by the CBRS spectrum. In this way, network traffic at a service edge of the aforementioned service segment may switch from the CBRS spectrum to the primary licensed RF band spectrum, thus avoiding a QoS deterioration due to signal attenuation of the CBRS spectrum.

It is noteworthy that the primary licensed RF band spectrum may be used exclusively for Guaranteed Bit Rate (GBR) transmissions, irrespective of the originating service segment. GBR transmissions are priority transmissions that relate to conversational voice, conversational video, real-time gaming, V2X messages, and buffered streaming of non-conversational video. All other transmissions, non-GBR transmissions, are best effort and subject to a spectrum allocation governed by the spectrum allocation controller.

By way of example, the spectrum allocation controller may identify, within a service area of a base station node, one or more spectrum bands that is available to support network traffic within the service area. The one or more spectrum bands may include a licensed spectrum, such as the primary licensed RF band spectrum (i.e. used for 2G, 3G, LTE, or 5G-NR) or CBRS spectrum, or unlicensed spectrum. The service area of the base station node may be defined by several factors, such as physical geographic terrain, technology, and radiofrequency. Base station nodes typically emit RF signals radially, such that the base station node is at the center of the service area and the breadth of the service area is defined by the distance an RF signal travels before signal attenuation impacts QoS.

The spectrum allocation controller may analyze network traffic within the service area to determine a QoS for instances of network traffic. The QoS may correspond to packet loss, latency, jitter, echo, downlink throughput, uplink throughout, or any combination thereof. In doing so, the spectrum allocation controller may allocate a subset of network traffic to the available spectrum to spread the network traffic serviced by the base station node.

For example, the base station node may use the primary licensed RF band spectrum as a baseline spectrum for network traffic within the service area. By allocating other available spectra (i.e. unlicensed spectrum and CBRS spectrum) to subsets of network traffic within the service area, the spectrum allocation controller may relieve network traffic on the primary licensed RF band spectrum, thus improving the QoS for network traffic served by the primary licensed RF band spectrum, and also improving the QoS for network traffic reallocated to other available spectra, particularly in cases where the primary licensed RF band spectrum had been overloaded.

Continuing with the previous example, the spectrum allocation controller may identify the unlicensed spectrum, CBRS spectrum, and primary licensed RF band spectrum as available within the service area. Based on an analysis of the network traffic, the spectrum allocation controller may act to relieve the baseline spectrum (i.e. primary licensed RF band spectrum) from network traffic and allocate subsets of network traffic, within service segments of the service area, to the unlicensed spectrum and the CBRS spectrum.

The term "service segment" is intended to describe a spectrum coverage area that extends radially from the base station node. The initial service segment extends radially from the base station node to a service edge defined by a spectrum's signal attenuation. In other words, the initial service segment is defined as the area in which the spectrum servicing the segment can maintain a threshold QoS despite signal attenuation. The geographic size of each service segment may vary as a function of signal attenuation of the serving spectrum. Unlicensed spectrum has smaller service segments relative to the service segments for the CBRS spectrum, which in turn have smaller service segments relative to service segments for the primary licensed RF band spectrum.

The allocation of network traffic between the available spectrum is a function of the capabilities of the available spectrum. For example, since the unlicensed spectrum provides less geographic coverage relative to the CBRS spectrum, the unlicensed spectrum may be used to serve network traffic adjacent to the base station node, namely an initial service segment. The CBRS spectrum may be used to serve network traffic within a second service segment that extends outward from the service edge of the initial service segment. The primary licensed RF band spectrum may be used to serve network traffic within a third service segment that extends outward from the service edge of the second service segment.

In response to identifying the available spectrum for service segments of a base station node, the spectrum allocation controller may generate scheduling criteria to allocate the subsets to network traffic within service segments to the available spectrum. In doing so, the spectrum allocation controller may transmit scheduling information to the base station node and control information to the client devices within each service segment that dynamically configures the use of the allocated available spectrum. The control information may configure the use of the allocated available spectrum for uplink transmissions, downlink transmissions, or both.

The CBRS spectrum may employ Time-Duplex Division (TDD) to near-simultaneously serve uplink and downlink transmissions. The primary licensed RF band spectrum may employ Frequency-Duplex Division (FDD) to simultaneously serve GBR, uplink transmissions, and downlink transmissions. Additionally, or alternatively, the primary licensed RF band spectrum may also employ TDD for GBR and non-GBR uplink and downlink transmissions.

In some examples, the spectrum allocation controller may configure control information to allocate uplink transmissions to one available spectrum (e.g. CBRS spectrum) and downlink transmissions to another available spectrum (e.g. unlicensed spectrum). The use of alternate available spectrum for uplink and downlink transmissions may be based on different QoS data associated with uplink and downlink transmissions within the service segment.

The spectrum allocation controller may use a number of methods to determine when and how to allocate the available spectrum within service segments of a base station node. These methods include a static method, a semi-static method, and a dynamic method of spectrum allocation.

The static method for spectrum allocation may rely on spectrum allocation rules to allocate network traffic to the available spectrum within a service area of a base station node. The spectrum allocation rules may define service segments of the base station node based on the available spectrum, and in doing so, allocate the available spectrum to the service segments. The allocation of spectrum to network traffic would be based solely on the geolocation of the network traffic occurring within one of the defined service segments. For example, if network traffic occurred in an initial service segment, the network traffic would be assigned to the spectrum associated with the initial service segment.

The spectrum allocation rules may be configured to define service segments based on the coverage capabilities of the available spectrum. For example, consider the availability of three spectra, namely the unlicensed spectrum, CBRS spectrum, and the primary licensed RF band spectrum. The spectrum allocation rules may be used to define the size of each service segment based on the geographic coverage and capability of the available spectrum. For instance, the initial service segment may be sized to accommodate maintaining a threshold QoS for an unlicensed spectrum, a subsequent service segment may be similarly sized to accommodate a CBRS spectrum, and a third service segment may accommodate the primary licensed RF band spectrum.

The semi-static method for spectrum allocation may rely on an analysis of real-time network traffic at the base station node and spectrum allocation rules that trigger re-allocating monitored network traffic to other, available spectrum. The spectrum allocation rules may be used to allocate a subset of network traffic to an available spectrum. These rules are functionally dependent on a predetermined QoS threshold that represents a minimum QoS for network traffic within the service area.

Under the semi-static method, the spectrum allocation controller may monitor network traffic within a service area and determine whether the QoS of the network traffic falls below a predetermined QoS threshold. If so, the spectrum allocation controller may use the spectrum allocation rules to trigger a process for re-allocating the network traffic to another, available spectrum.

The predetermined QoS threshold used to trigger a re-allocation of network traffic to another available spectrum may be set by an operator of the telecommunications network, an administrator of the spectrum allocation controller. In some instances, the predetermined QoS threshold may be set by a Service Level Agreement (SLA) associated with a client device being served by the telecommunications network. Referring to the latter, in some examples, service priorities may be assigned to client devices of select subscribers. Client devices associated with the select subscribers may be guaranteed higher threshold QoS relative to other network subscribers.

Under the semi-static method for spectrum allocation, substantially all network traffic may be served by a baseline spectrum, such as the primary licensed RF band spectrum. Re-allocation of network traffic to other available spectra would occur in response to the QoS of the network traffic being less than the predetermined QoS threshold. In some examples, only subsets of network traffic with a QoS less than the predetermined QoS threshold are reallocated. In another example, the spectrum allocation rules may be used to trigger the re-allocation of a larger subset of network traffic, such as all network traffic within a service segment. In yet another example, the spectrum allocation rules may be used to trigger the re-allocation of substantially all network traffic.

The dynamic method for spectrum allocation may rely on the analysis of real-time network traffic at the base station node. For example, the spectrum allocation controller may employ one or more machine learning algorithms to correlate real-time network traffic with historical network traffic, and in doing so, infer whether the QoS of real-time network traffic is likely less than a predetermined QoS threshold. The one or more trained machine-learning algorithms may make use of techniques such as supervised learning, unsupervised learning, semi-supervised learning, naive Bayes, Bayesian network, decision trees, neural networks, fuzzy logic models, and/or probabilistic classification models.

Moreover, the spectrum allocation controller may generate a spectrum allocation data model based on historical network traffic over a predetermined time interval. The historical network traffic data may include QoS data components similar to those used to determine whether to re-allocate network traffic to other, available spectrum, and an indication of the available spectrum allocated to service segments within the service area of the base station node. As more historical network traffic data becomes available, the spectrum allocation controller may continuously update the statistical model so that a more accurate model is developed.

Additionally, the semi-static and the dynamic methods for spectrum allocation can be used to change the spectrum allocation for a client device based on a change in the geolocation of the client device. For example, the spectrum allocation controller may detect a change in the geolocation of the client device from a first service segment to a second service segment. In doing so, the spectrum allocation controller may generate control information that dynamically configures the use of the spectrum associated with the second service segment.

Further, the term "techniques," as used herein, may refer to system(s), method(s), computer-readable instruction(s), module(s), algorithms, hardware logic, and/or operation(s) as permitted by the context described above and through the document.

Figure 1:
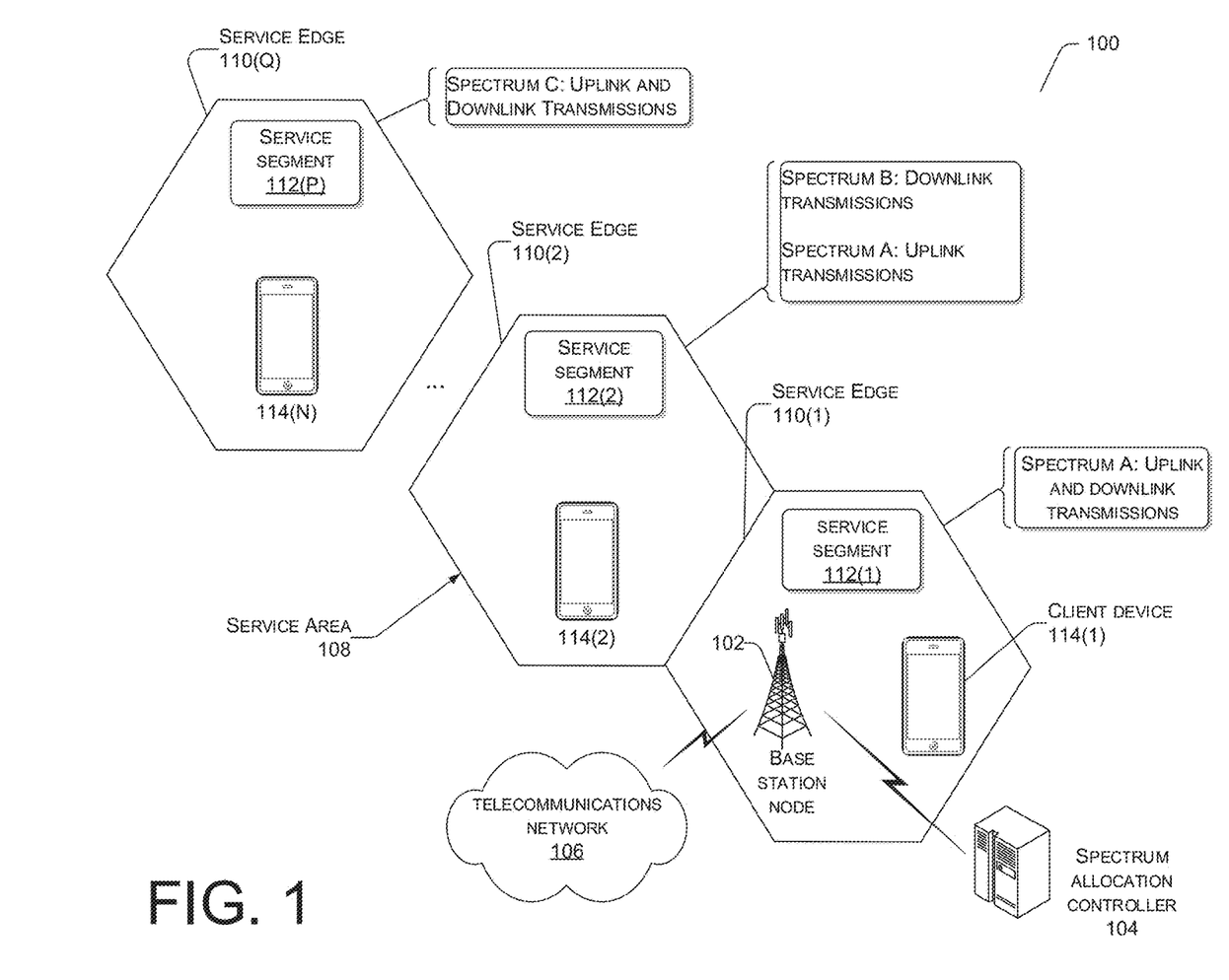
FIG. 1 illustrates a computing environment that facilitates the operation of the spectrum allocation controller.

FIG. 1 illustrates a computing environment that facilitates the operation of the spectrum allocation controller. The computing environment 100 may include a base station node 102 and a spectrum allocation controller 104. The base station node 102 is responsible for handling voice and data traffic associated with a telecommunications network 106. The telecommunications network 106 may correspond to one of 2G, 3G, Long-term Evolution (LTE), or 5G-New Radio (5G-NR) network.

The base station node 102 is configured to support one or more available spectrum within its service area 108. The one or more available spectrum comprises at least an unlicensed spectrum, CBRS spectrum, and primary licensed RF band spectrum. In the illustrated example, the service area 108 spans radially from the base station node 102 to an outmost service edge 110(Q). The outmost service edge 110(Q) demarcates the service limit of the base station node 102.

The service area 108 comprises service segment(s) 112(1)-112(P). As shown in FIG. 1, the service segment(s) 112(1)-112(P) extends radially from the base station node 102 and are separated by adjoining service edge(s) 110(1)-110(Q). For example, service edge 110(1) separates service segment 112(1) and service segment 112(2), and service edge 110(2) separates service segment 112(2) and service segment 112(P).

The service edge(s) 110(1)-110(Q) for each of the service segment(s) 112(1)-112(P) are defined by the signal attenuation characteristics of the serving, available spectrum. In other words, each service edge defines the outmost boundary at which an available spectrum can be relied upon to maintain an adequate level of service, despite signal attenuation. An adequate level of service is measured by a QoS metric relative to a predetermined QoS threshold. For example, service edge 110(1) represents the outermost boundary of the available spectrum allocated to service segment 112(1). Accordingly, the available spectrum can be relied upon to maintain an adequate level of service with the service segment 112(1). At any point beyond service edge 110(1), the available spectrum allocated to service segment 112(1) cannot be relied upon to provide an adequate level of service.

In the illustrated example, the spectrum allocation controller 104 may be configured to allocate the available spectrum to each of the service segment(s) 112(1)-112(P). In the illustrated example, the available spectrum may be allocated with each service segment for uplink transmissions, downlink transmissions, or both. Accordingly, when client device(s) 114(1)-114(N) roam within one of the service segment(s) 112(1)-112(P), network traffic associated with the client device(s) 114(1)-114(N) may be designated to the available spectrum that corresponds to that service segment.

For example, client device 114(2) may use Spectrum A for uplink transmissions and Spectrum B for downlink transmissions while client device 114(2) is geographically located within service segment 112(2). It is noteworthy that the designations Spectrum A, B, and C, as illustrated in FIG. 1, refer to the available spectrum. By way of example, the available spectrum may include a primary licensed RF band spectrum (i.e. 2G, 3G, LTE, and 5G-NR), CBRS spectrum, or unlicensed spectrum.

While FIG. 1 illustrates a service area 108 that comprises three service segments, further variations, and modifications can be made such that any number of available spectrum and service segments can be incorporated into the service area 108.

The spectrum allocation controller 104 may operate on one or more distributed computing resource(s). The one or more distributed computing resource(s) may include one or more computing device(s) that operate in a cluster, cloud, or other configuration to share resources, balance load, increase performance, provide fail-over support or redundancy, or for other purposes. The one or more computing device(s) may include one or more interfaces to enable communications with other networked devices, such as the client device(s) 114(1)-114(N) via one or more network(s).

In the illustrated example, the spectrum allocation controller 104 is communicatively coupled to the base station node 102 via one or more networks. In other examples, the spectrum allocation controller 104 may reside within the base station node 102.

The one or more network(s) may include public networks such as the Internet, private networks such as an institutional and/or personal intranet, or some combination of private and public network(s). The one or more network(s) can also include any type of wired and/or wireless network, including but not limited to local area network (LANs), wide area network(s) (WANs), satellite networks, cable networks, Wi-Fi networks, Wi-Max networks, mobile communications networks (i.e. 5G-NR, LTE, 3G, 2G), or any combination thereof.

Moreover, the client device(s) 114(1)-114(N) may include any sort of electronic device, such as a television unit, a multimedia streaming device, a cellular phone, a smartphone, a tablet computer, an electronic reader, a media player, a gaming device, a personal computer (PC), a laptop computer, etc. The client device(s) 114(1)-114(N) may also include network devices that act as intermediaries between the client device(s) 114(1)-114(N) that execute user applications and the Internet. It is noteworthy that the Internet is accessible via one or more network(s). In some examples, the client device(s) 114(1)-114(N) may include a subscriber identity module (SIM), such as an eSIM, to identify the client device(s) 114(1)-114(N) to a telecommunication service provider (also referred to herein, as "telecommunications network").

Figure 2:
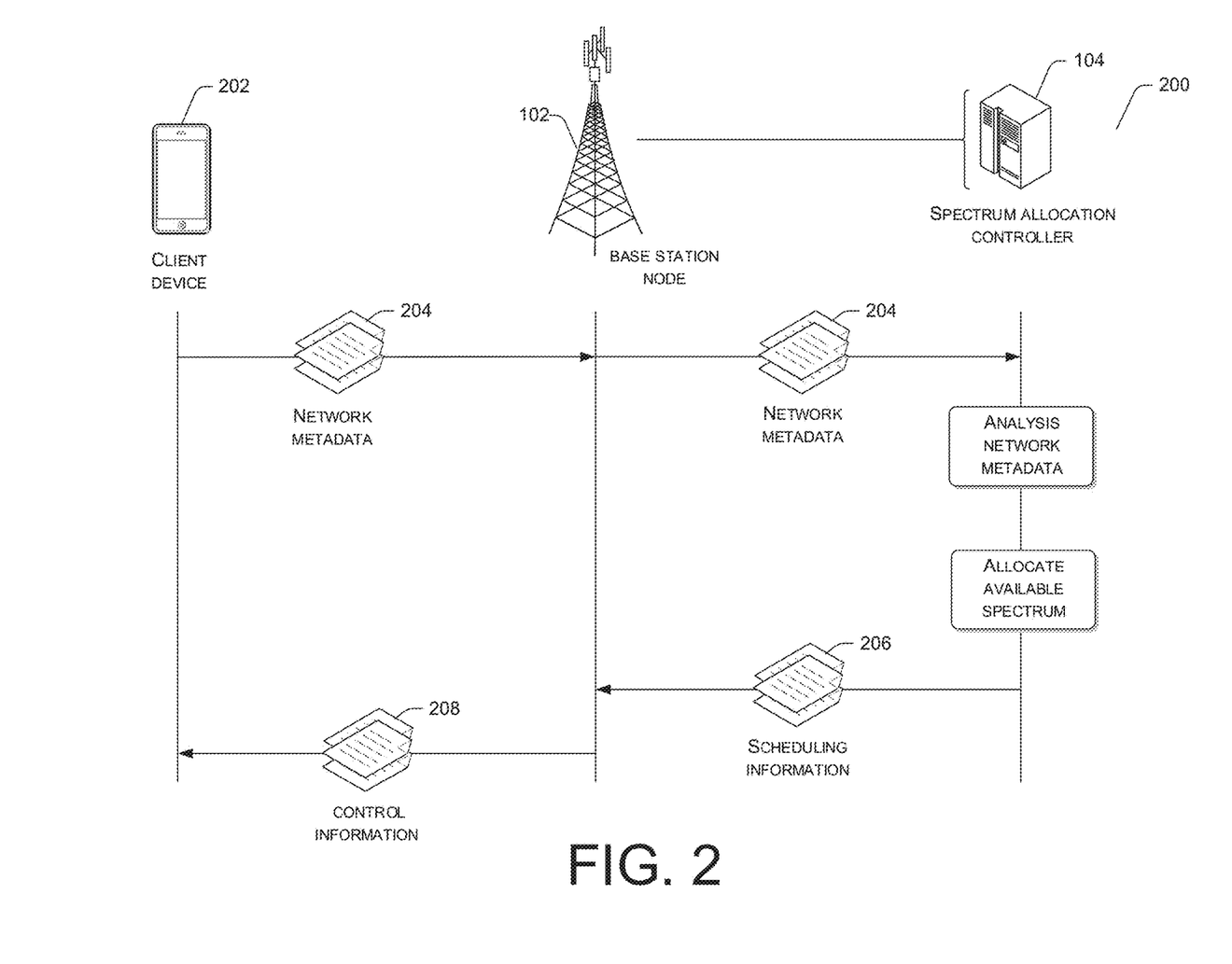
FIG. 2 illustrates a block diagram of a spectrum allocation controller analyzing network metadata and providing scheduling criteria to allocate available spectrum within a service area of a base station node.

FIG. 2 illustrates a block diagram of a spectrum allocation controller analyzing network metadata and providing scheduling criteria to allocate available spectrum within a service area of a base station node. In the illustrated example, client device 202 may correspond to one of the client device(s) 114(1)-114(N). Further, the client device 202 may operate within one of the service segment(s) 112(1)-112(P) associated with the base station node 102.

In the illustrated example, the spectrum allocation controller 104 may receive network metadata 204 from the client device 202 and the base station node 102. The network metadata 204 may include one or more of client device identifiers, geolocations of client devices within the service area, and network usage data. Client device identifiers may comprise a phone number, a Public Land Mobile Network ID (PLMN ID), a Mobile Station International Subscriber Directory Number (MSISDN), an International Mobile Subscriber Identity (IMSI), or any combination thereof. Network usage data may comprise uplink and downlink transmission throughputs, signal strength and quality, indications of packet loss, jitter, and latency issues The spectrum allocation controller 104 may analyze the network metadata 204 and determine a QoS metric associated with the client device 202 and the service segment within which the client device 202 resides. The spectrum allocation controller 104 may rely on spectrum allocation rules to allocate network traffic to the available spectrum. Additionally, the spectrum allocation controller 104 may use a static, semi-static, or dynamic method of analysis to determine whether to allocate available spectrum to client devices within a service segment or a client device with a service priority.

Moreover, the spectrum allocation controller 104 may generate scheduling criteria to allocate the available spectrum within a service area of a base station node. The scheduling criteria may include scheduling information 206 for the base station node 102 to allocate subsets of network traffic to the available spectrum. The scheduling information 206 may allocate all network traffic to the available spectrum associated with a service segment. Alternatively, the scheduling information 206 may allocate available spectrum to network traffic associated with client devices that have a service priority.

The scheduling criteria may also include control information 208 intended for the client device 202 operating within the service area of the base station node 102. The control information 208 may configure the use of the allocated available spectrum for uplink transmissions, downlink transmissions, or both. In one example, the spectrum allocation controller 104 may transmit the control information 208 to the client device 202. In another example, the scheduling criteria may comprise only scheduling information 206 for the base station node 102, in which case, the base station node 102 may generate the control information 208 for delivery to the client device 202.

Figure 3:
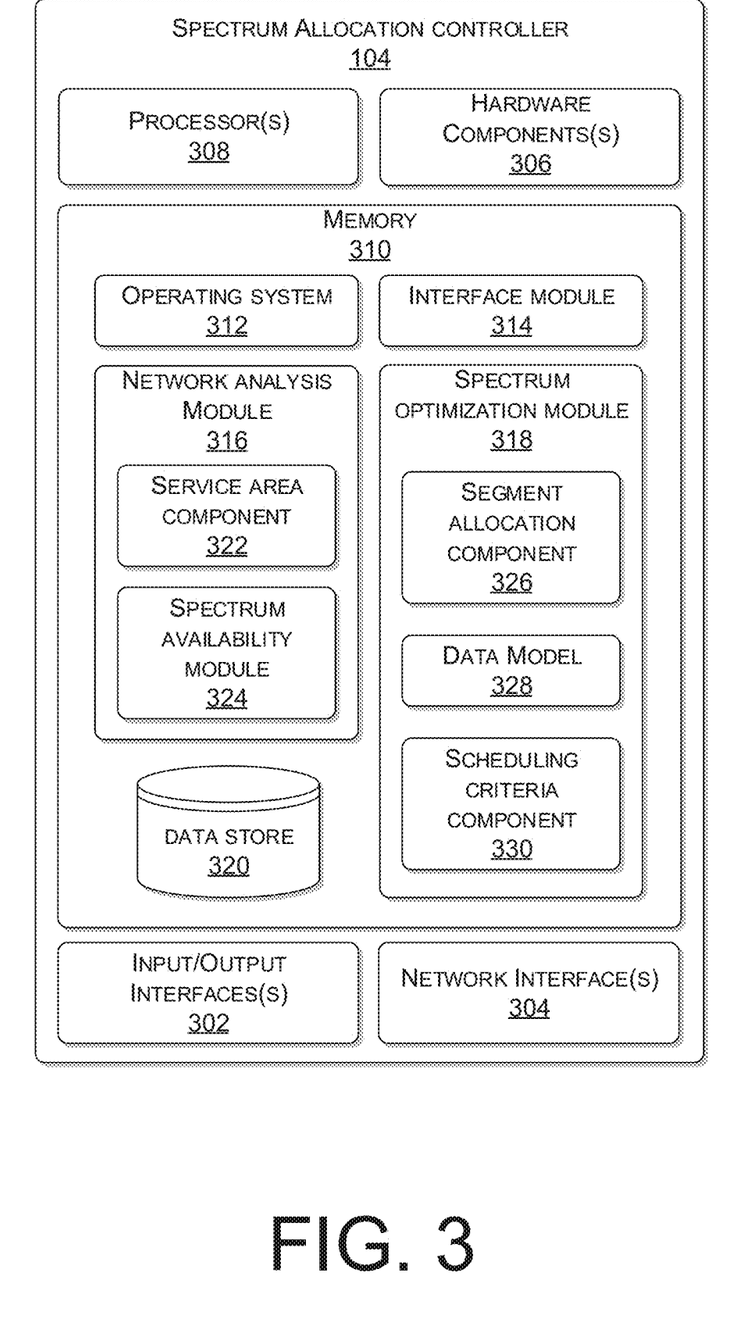
FIG. 3 illustrates various components of a spectrum allocation controller that is communicatively coupled to a base station node.

FIG. 3 illustrates various components of a spectrum allocation controller that is communicatively coupled to a base station node. The base station node 102 may be configured to support one or more available spectrum within service segments of its service area. Available spectrum may include 2G, 3G, LTE, or 5G-NR air-interface technologies, CBRS spectrum, unlicensed spectrum, or any combinations thereof. Further, the spectrum allocation controller 104 may monitor uplink and downlink network traffic at the base station node 102, and in doing so, infer an allocation of available spectrum within each service segment that optimizes underlying QoS metrics.

The spectrum allocation controller 104 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the spectrum allocation controller 104 may include network interface(s) 304. The network interface(s) 304 may include any sort of transceiver known in the art. For example, the network interface(s) 304 may include a radio transceiver that performs the function of transmitting and receiving radio frequency communications via an antenna. Also, the network interface(s) 304 may include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB). Hardware component(s) 306 may include additional hardware interface, data communication hardware, and data storage hardware.

Further, the spectrum allocation controller 104 may include one or more processor(s) 308 that are operably connected to memory 310. In at least one example, the one or more processor(s) 308 may be a central processing unit(s) (CPU), graphics processing unit(s) (GPU), or both a CPU and GPU or any other sort of processing unit(s). Each of the one or more processor(s) 308 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 308 may also be responsible for executing all computer applications stored in the memory, which can be associated with common types of volatile (RAM) and/or non-volatile (ROM) memory.

In some examples, memory 310 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 310 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 310 may include an operating system 312, an interface module 314, a network analysis module 316, a spectrum optimization module 318, and a data store 320. The operating system 312 may be any operating system capable of managing computer hardware and software resources. The operating system 312 may include an interface layer that enables applications to interface with the input/output interface(s) 302 and the network interface(s) 304.

The interface module 314 may be configured to interact with the base station node 102 and the client device(s) 114(1)-114(N) within the service area of the base station node 102. More specifically, the interface module 314 may receive network metadata that may be used by other modules within the spectrum allocation controller 104, namely the network analysis module 316 and the spectrum optimization module 318, to determine whether to allocate available spectrum to service segments of the service area.

The interface module 314 may also transmit scheduling information to the base station node 102 and control information to the client device(s) 114(1)-114(N). The scheduling information may be used to dynamically configure the use of the allocated available spectrum to the client device(s) 114(1)-114(N) within the service area. The scheduling information may be specific to uplink transmissions, downlink transmissions, or both. The control information is intended for use by the client device(s) 114(1)-114(N) to dynamically configure the use of an allocated spectrum for uplink transmissions, downlink transmissions, or both.

The network analysis module 316 may further include a service area component 322 and a spectrum availability component 324. The spectrum availability component 324 may identify available spectrum within a service area of a base station node. The spectrum available spectrum may include one or more of the primary licensed RF spectrum (i.e. 2G, 3G, LTE, or 5G-NR), CBRS spectrum, unlicensed spectrum, or any combination thereof. Further, the spectrum availability component 324 may monitor the availability of spectrum per a predetermined schedule, in case that the availability of a particular spectrum, such as CBRS, is time limited.

The service area component 322 may determine a size of a service segment for each available spectrum. The size of each service segment is a function of signal attenuation of the serving available spectrum and spans radially from the base station node to its service edge. The service edge corresponds to an outermost boundary of a service segment whereby the corresponding available spectrum (i.e. unlicensed spectrum, CBRS spectrum, or licensed spectrum) can maintain a predetermined QoS threshold, despite signal attenuation.

In some examples, the size of each service segment may be based on spectrum allocation rules that reside in the data store 320. The spectrum allocation rules may define the size of each service segment based on the geographic coverage and capability of the available spectrum. Further, the spectrum allocation rules may define an allocation order for multiple available spectra based on the relative sizes of their service segments. For example, an available spectrum with a relatively small-size service segment (i.e. unlicensed spectrum) may be positioned nearest to the base station node, and an available spectrum with a relatively large-size service segment (i.e. primary licensed RF band spectrum) may be positioned furthest from the base station node. An illustration of an order of spectrum allocation is shown in FIG. 1 of this disclosure.

The spectrum optimization module 318 may further include a spectrum allocation component 326, a data model component 328, and a scheduling criteria component 330. The spectrum allocation component 326 may determine when and how to allocate the available spectrum within service segments of a base station node. The methods may include a static method, a semi-static method, and a dynamic method of spectrum allocation.

The static method may rely on spectrum allocation rules to associate available spectrum to service segments within a service area, and then allocate available spectrum to network traffic based solely on the geolocation of the network traffic occurring within one of the defined service segments. For example, if network traffic occurred in an initial service segment, the network traffic would be assigned to the spectrum associated with the initial service segment.

The semi-static method may rely on an analysis of real-time network traffic at the base station node to trigger the allocation of network traffic to another, available spectrum. Under the semi-static method, the spectrum allocation component 326 may monitor network traffic within a service area and determine whether the QoS of the network traffic falls below a predetermined QoS threshold. If so, the spectrum allocation component 326 may use the spectrum allocation rules to trigger a process for allocating and/or re-allocating network traffic to an available spectrum.

The dynamic method for spectrum allocation may rely solely on analysis of real-time network traffic at the base station node. For example, the spectrum allocation controller may employ one or more machine learning algorithms to correlate real-time network traffic with historical network traffic, and in doing so, infer whether the QoS of real-time network traffic is likely less than a predetermined QoS threshold. In this way, the spectrum allocation component 326 may rely upon the spectrum allocation data model, retrieved from the data model component 328, to trigger a process for allocating and/or re-allocating network traffic to an available spectrum.

In various examples, the spectrum allocation component 326 may employ the semi-static and/or dynamic method for spectrum allocation to allocate available spectrum to a plurality of client devices within a service segment or to specific client devices with a predefined, service priority. The service priority may be set by an SLA or other contractual mechanism. In other words, the spectrum allocation component 326 may interrogate spectrum allocation rules that identify whether a client device has a service priority and whether the service priority triggers and/or prioritizes the allocation of available spectrum to the client device.

The data model component 328 may generate a spectrum allocation data model based on historical network traffic over a predetermined time interval. The historical network traffic data may include QoS data components similar to those used to determine whether to re-allocate network traffic to other, available spectrum, and an indication of the available spectrum allocated to service segments within the service area of the base station node. As more historical network traffic data becomes available, the spectrum allocation controller may continuously update the statistical model so that a more accurate model is developed.

The scheduling criteria component 330 may generate scheduling criteria for delivery to the base station node and client devices. The scheduling criteria may include scheduling information for the base station to allocate subsets of network traffic to the available spectrum. The scheduling information may allocate all network traffic to the available spectrum associated with a service segment. Alternatively, the scheduling information may allocate available spectrum to network traffic associated with client devices that have a service priority.

The scheduling criteria component 330 may also generate control information intended for client devices operating with the service area of the base station node. The control information may configure the use of the allocated available spectrum for uplink transmissions, downlink transmissions, or both.

The data store 320 may include a repository of spectrum allocation rules, and data models from the data model component 328 generated over time. The data store 320 may also include historical instances of network metadata from client devices served by the base station node, network metadata from the base station node, itself, and any other data pertinent to an operation of the spectrum allocation controller 104.

Figure 4:
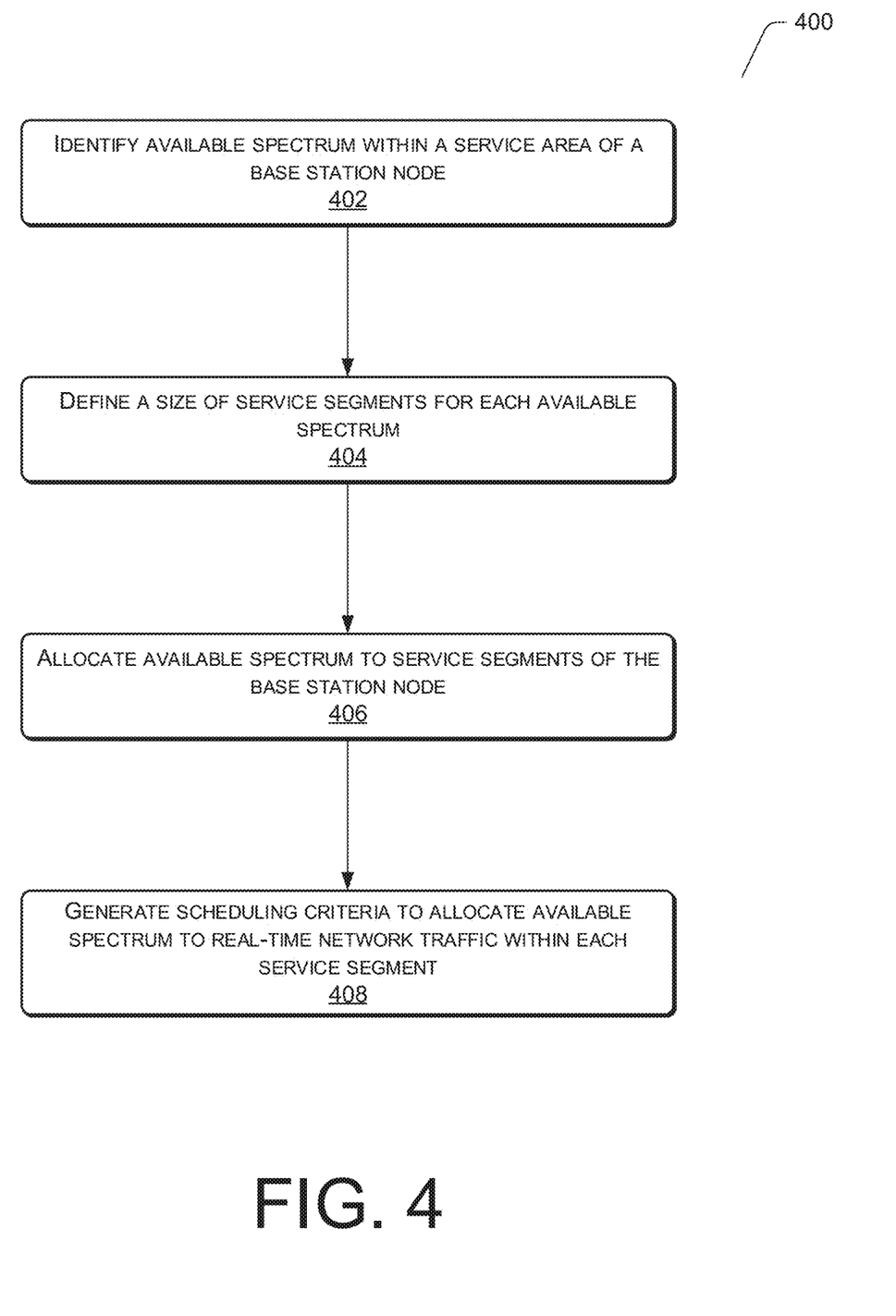
FIG. 4 illustrates a process for generating scheduling criteria to allocate available spectrum to real-time network traffic within segments of a service area.
Figure 5:
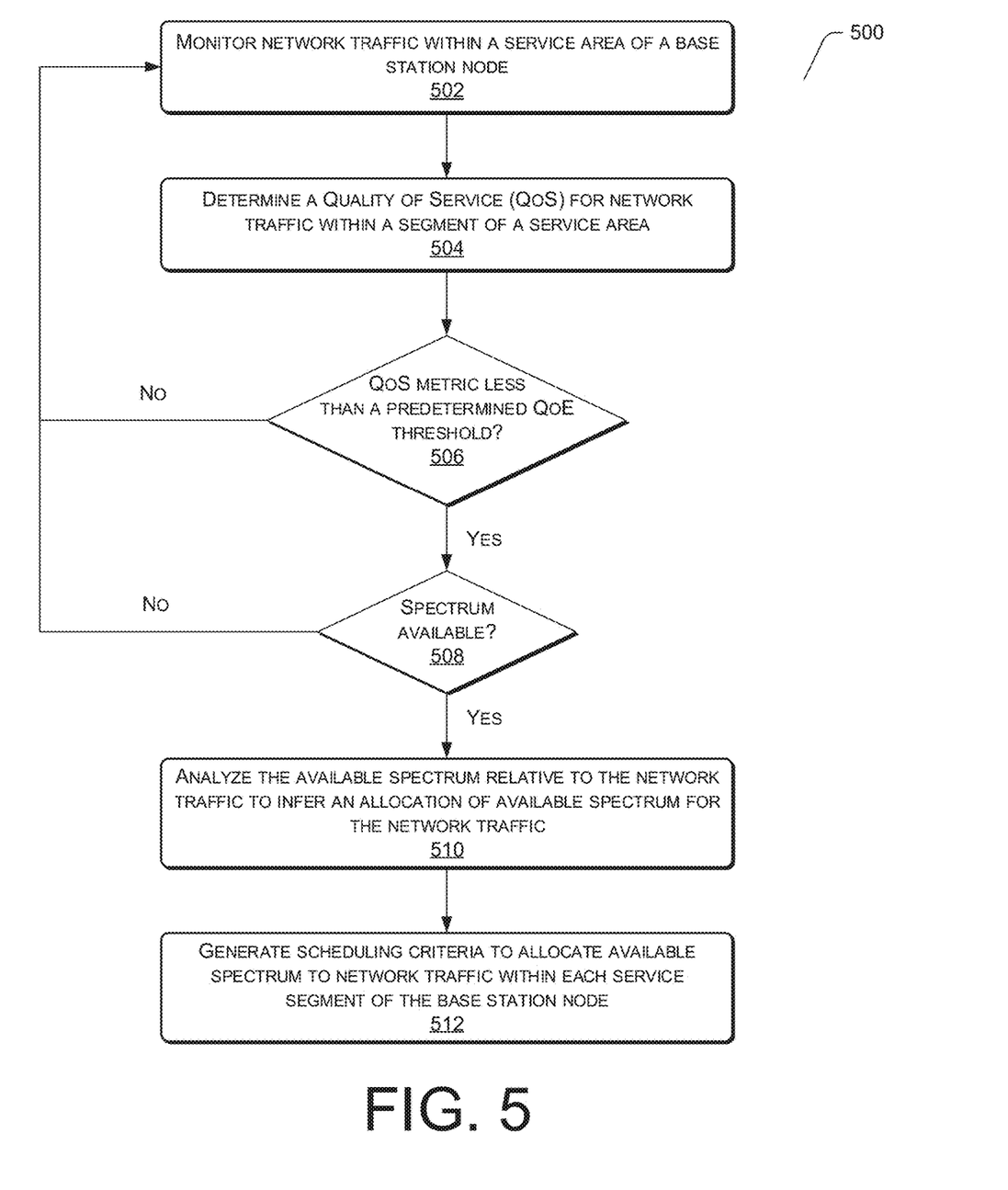
FIG. 5 illustrates a process for monitoring network traffic and dynamically modifying the allocation of available spectrum to service segments of a base station node.
Figure 6:
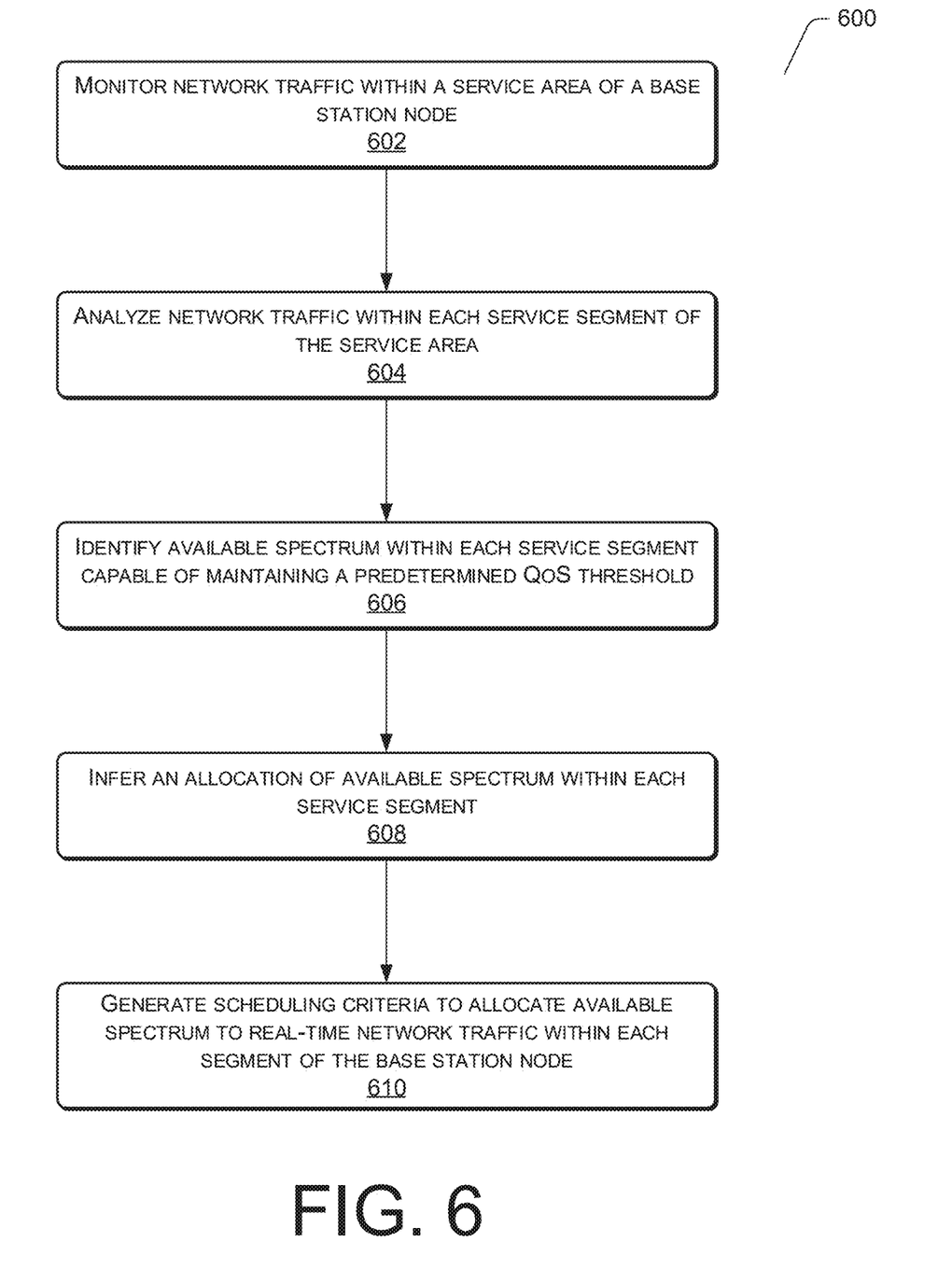
FIG. 6 illustrates a process for analyzing network traffic within a service area and inferring an optimized allocation of available spectrum.

FIGS. 4, 5, and 6 present processes 400, 500, and 600 that relate to operations of the spectrum allocation controller. Each of the processes 400, 500, and 600 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400, 500, and 600 are described with reference to the computing environment 100 of FIG. 1.

FIG. 4 illustrates a process for generating scheduling criteria to allocate available spectrum to real-time network traffic within segments of a service area. Process 400 is described from the perspective of a spectrum allocation controller that is communicatively coupled to a base station node. In this example, the base station node is configured to provide the licensed and unlicensed spectrum. Further process 400 describes an allocation of available spectrum using a static spectrum allocation method.

At 402, the spectrum allocation controller may identify the available spectrum within a service area of a base station node. The available spectrum may include one or more of the primary licensed RF spectrum (i.e. 2G, 3G, LTE, or 5G-NR), CBRS spectrum, unlicensed spectrum, or any combination thereof.

At 404, the spectrum allocation controller may define a size of service segments for each available spectrum. A service segment corresponds to a spectrum coverage area that extends radially from the base station node. The size of each service segment is a function of signal attenuation of the serving, available spectrum.

Service segments may be defined based on spectrum allocation rules. The spectrum allocation rules may define a service segment for each available spectrum. The service segment may span radially from the base station node to its service edge. The service edge corresponds to an outermost boundary of a service segment whereby an available spectrum (i.e. unlicensed spectrum, CBRS spectrum, or licensed spectrum) can maintain a predetermined QoS threshold, despite signal attenuation. In other words, an available spectrum can maintain a predetermined QoS threshold within its service segment, which spans radially from the base station node to its service edge.

The size of each service segment may vary between available spectrum based on signal attenuation characteristics of each available spectrum. For example, the unlicensed spectrum has a higher signal attenuation relative to the CBRS spectrum, and therefore, despite boasting a greater bandwidth, is associated with smaller-sized service segments.

For example, the unlicensed spectrum, which may operate within the 2.4 GHz and 5 GHz and other bands, provides relatively high bandwidth but low geographic coverage (i.e. service area coverage) due to signal attenuation, when compared to the primary licensed RF band spectrum. Therefore, the service segment defined for the unlicensed spectrum is geographically smaller relative to the primary licensed RF band spectrum.

At 406, once the service edge of the available spectrum is defined, the spectrum allocation controller may allocate the available spectrum to each service segment of the base station node. In other words, the spectrum allocation controller may allocate an available spectrum with the smallest-sized service segment to an initial service segment nearest to the base station node. Available spectrum with progressively larger-sized service segments may be allocated as subsequent service segments.

By way of example, the spectrum allocation controller may allocate the unlicensed spectrum to an initial service segment nearest to the base station node due to the lower geographic coverage (i.e. service area coverage) of the unlicensed spectrum relative to the CBRS spectrum and the primary licensed RF band spectrum.

Similarly, the spectrum allocation controller may allocate the CBRS spectrum to a next service segment that is immediately outward and adjacent to the initial service segment, due to its improved geographic coverage relative to the unlicensed spectrum, but lower geographic coverage relative to the primary licensed RF band spectrum.

Finally, the spectrum allocation controller may allocate the primary licensed RF band spectrum to a third service segment due to its improved geographic coverage relative to the CBRS spectrum and the unlicensed spectrum.

In some examples, the spectrum allocation controller may allocate multiple spectra to a service segment based on the spectrum allocation rules. For example, the spectrum allocation controller may detect a peak in downlink transmissions within a service segment and dedicate an available spectrum to service the downlink transmissions within the service segment. In doing so, an alternate available spectrum may be used to service uplink transmissions within the service segment.

At 408, the spectrum allocation controller may generate scheduling criteria to allocate available spectrum to real-time network traffic within each service segment. The scheduling criteria may comprise scheduling information for the base station node and control information for client devices within the service area of the base station node. The scheduling information is intended for use by the base station node to dynamically configure the use of the allocated available spectrum to client devices within each service segment. Available spectrum may be allocated for uplink transmissions, downlink transmissions, or both.

The control information is intended for use by the client devices to dynamically configure the use of the allocated available spectrum on the client devices themselves, for uplink transmissions, downlink transmissions, or both. In some examples, the scheduling criteria may comprise only scheduling information for the base station node, in which case, the base station node may generate corollary control information for delivery to each client device with its service area.

In one example, the spectrum allocation controller may interact with the base station node to determine a geolocation of client devices within its service area. Based on the determined geolocation, a corresponding service segment may be associated with each client device. Thus, the spectrum allocation controller may generate scheduling criteria that allocate an available spectrum to each client device, based on each client device's service segment (i.e. geolocation).

FIG. 5 illustrates a process for monitoring network traffic and dynamically modifying the allocation of available spectrum to service segments of a base station node. Process 500 is described from the perspective of a spectrum allocation controller that is communicatively coupled to a base station node. In this example, the base station node is configured to provide licensed and unlicensed spectrum. Further, process 500 describes an allocation of available spectrum using a semi-static and dynamic spectrum allocation method.

At 502, the spectrum allocation controller may monitor network traffic within a service area of a base station node. In monitoring network traffic, the spectrum allocation controller may retrieve network metadata from the client device(s) within the service area of the base station node. The network metadata may include one or more of client device identifiers, geolocations of client devices within the service area, and network usage data. Client device identifiers may comprise a phone number, a Public Land Mobile Network ID (PLMN ID), a Mobile Station International Subscriber Directory Number (MSISDN), an International Mobile Subscriber Identity (IMSI), or any combination thereof. Network usage data may comprise uplink and downlink transmission throughputs, indications of packet loss, jitter, and latency issues At 504, the spectrum allocation controller may determine a QoS metric for network traffic within a segment of the service area. For example, the spectrum allocation controller may aggregate network metadata within the service area and calculate a QoS metric for each service segment based on network usage data. For example, network metadata may be aggregated based on the geolocation of client devices to determine a mean-QoS metric for each service segment that is based on the average uplink throughput, downlink throughput, packet loss, jitter, latency, or any combination thereof.

Additionally, or alternatively, the spectrum allocation controller may analyze network metadata on a client device by client device basis, to prioritize the allocation of available spectrum to client devices with a service priority. The service priority may be set by an SLA or other contractual mechanism. In other words, the spectrum allocation controller may first identify a subset of client devices with a service priority, determine the QoS metrics for the subset of client devices, and if the QoS metrics fall below the predetermined QoS threshold, prioritize the allocation of available spectrum to the subset of client devices.

At 506, the spectrum allocation controller may determine whether the QoS metric is less than the predetermined QoS threshold. The predetermined QoS threshold may represent a minimum QoS for network traffic within a service area. The predetermined QoS threshold may be set by an administrator of the spectrum allocation controller, an operator of the telecommunications network, or via an SLA associated with a client device.

In response to determining that the QoS metric is greater than or equal to the predetermined threshold, the spectrum allocation controller may return to process step 502 and continue to monitor network traffic within the service area of the base station node.

At 508, in response to determining that the QoS metric is less than the predetermined QoS threshold, the spectrum allocation controller may determine that the QoS metric is less than the predetermined QoS threshold. Accordingly, the spectrum allocation controller may determine whether the other spectrum is available within the service area to improve the QoS metric. The available spectrum may include one or more primary licensed RF spectrum (i.e. 2G, 3G, LTE, or 5G-NR), CBRS spectrum, or unlicensed spectrum.

At 510, the spectrum allocation controller may employ one or more machine learning algorithms to analyze the available spectrum relative to subsets of network traffic that exhibit a QoS metric that is less than the predetermined QoS threshold. Pursuant to the analysis, the spectrum allocation controller may allocate the available spectrum that improves the QoS metric of the subsets of network traffic to at least equal the predetermined QoS threshold. In one example, the spectrum allocation controller may allocate the available spectrum to client devices within a service segment, that in aggregate, exhibit a QoS metric less than the predetermined QoS threshold. In other examples, the allocation of the available spectrum may be made on a client device-by-client device basis. For example, the spectrum allocation controller may prioritize the allocation of available spectrum to client devices that have an assigned service priority.

By way of example, consider a service segment nearest to a base station node that is serviced by a primary licensed RF band spectrum. The primary licensed RF band spectrum may be configured to service uplink and downlink transmissions within the service segment. Further, the spectrum allocation controller may detect a reduction in the QoS metric of network traffic within the service segment. To alleviate the network traffic on the primary licensed RF band spectrum, the spectrum allocation controller may allocate at least one of downlink or uplink transmissions to another available spectrum, such as an unlicensed spectrum or CBRS spectrum, each of which may be configured to maintain at least the predetermined QoS threshold within the service segment. The benefit is two-fold. First, the spectrum allocation controller may relieve the network traffic on the primary licensed RF band spectrum, such that the primary licensed RF band spectrum can be used in other service segments that are not adequately serviced by another available spectrum. Second, the spectrum allocation controller may ensure that a predetermined QoS threshold is maintained within the service segment at issue.

At 512, the spectrum allocation controller may generate scheduling criteria for delivery to the base station node and client devices within each service segment of the base station node. The scheduling criteria may include scheduling information for the base station node and control information for client devices within the service area of the base station node. Alternatively, the scheduling criteria may comprise of only scheduling information for the base station node, in which case, the base station node may generate corollary control information for client devices within each service segment.

FIG. 6 illustrates a process for analyzing network traffic within a service area and inferring an optimized allocation of available spectrum. Process 600 is described from the perspective of the spectrum allocation controller that is communicatively coupled to a base station node. In this example, the spectrum allocation controller may analyze network traffic within a service area and optimize an allocation of available spectrum within service segments to relieve network traffic of a particular spectrum, optimize the QoS metric within service segments, or a combination of both.

At 602, the spectrum allocation controller may monitor network traffic within a service area of a base station node. More specifically, the spectrum allocation controller may retrieve network metadata from the client device(s) within the service area. Network metadata may comprise client identifiers, geolocations of client devices, and network usage data.

At 604, the spectrum allocation controller may employ one or more machine-learning algorithms to analyze network traffic within each service segment of the service area. In doing so, the spectrum allocation controller may infer a mean-QoS metric for each service segment that is based on averaged network usage data (i.e. uplink throughput, downlink throughput, packet loss, jitter, latency, or any combination thereof).

At 606, the spectrum allocation controller may identify the available spectrum within each service segment that is capable of maintaining a predetermined QoS threshold. For example, a service segment nearest to the base station node may have primary licensed RF band spectrum, CBRS spectrum, and unlicensed spectrum as an available spectrum, each of which is capable of maintaining a predetermined QoS threshold. In another service segment, further away from the base station node, only the primary licensed RF band spectrum and CBRS spectrum may be available and capable of maintaining a predetermined QoS threshold.

At 608, the spectrum allocation controller may infer an allocation of available spectrum within each service segment based on the analysis of network traffic and the availability of spectrum within each service segment. The inferred allocation is intended to optimize the QoS metric(s) across all service segment(s) of the service area. For example, the spectrum allocation controller may determine that an available spectrum, such as the CBRS spectrum, is being used to service multiple service segments, and in at least one of the multiple service segments (i.e. an overlapping service segment), another spectrum (i.e. an unlicensed spectrum, for example) is available but is not being used. To relieve network traffic on the CBRS spectrum, the spectrum allocation controller may infer an allocation of the unlicensed spectrum within the overlapping spectrum, provided the unlicensed spectrum is capable of maintaining a predetermined QoS threshold.

In this way, the network traffic on the CBRS spectrum is relieved by allocating a portion of its overall network traffic (i.e. network traffic within overlapping service segments) to another available spectrum (i.e. unlicensed spectrum). Thus, the benefit of the spectrum reallocation is two-fold. First, the mean-QoS metric for the service segment that is allocated an alternate available spectrum may improve based on the performance characteristics of the alternate available spectrum. Second, the mean-QoS metrics for other service segments supported by the CBRS spectrum may improve due to the reduced network traffic that is required of the CBRS spectrum.

At 610, the spectrum allocation controller may generate scheduling criteria for delivery to the base station node and client devices within the service area of the base station node. The scheduling criteria may include scheduling information for the base station node and control information for client devices within the service area of the base station node. Alternatively, the scheduling criteria may comprise of only scheduling information for the base station node, in which case, the base station node may generate corollary control information for client devices within each service segment.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A spectrum allocation controller, comprising:
one or more processors; and
memory coupled to the one or more processors, the memory including one or more modules that are executable by the one or more processors to:
identify, within a service area of a base station node, one or more available spectrum to facilitate transmission of network traffic within the service area;
determine a first subset of network traffic that occurs within a first service segment of the base station node, the first service segment extending from the base station node to a first service edge;
allocate the first subset of network traffic to at least a first spectrum of the one or more available spectrum;
determine a second subset of network traffic that occurs within a second service segment of the base station node that extends outward from the first service edge;
employ a machine-learning algorithm to correlate real-time network traffic with historical network traffic in the first service segment to infer whether a first quality of service (QoS) within the first service segment is less than a predetermined QoS threshold;
employ the machine-learning algorithm to correlate real-time network traffic with historical network traffic in the second service segment to infer whether a second QoS within the second service segment is less than the predetermined QoS threshold; and
allocate the second subset of network traffic to at least a second spectrum based at least in part on the first QoS or the second QoS being less than the predetermined QoS threshold.

2. The spectrum allocation controller of claim 1, wherein the one or more available spectrum include a subset of unlicensed spectrum, licensed spectrum, and citizens broadband radio service spectrum.

3. The spectrum allocation controller of claim 1, wherein the one or more modules are further executable by the one or more processors to:
generate scheduling criteria to allocate the first subset of network traffic to at least the first spectrum and the second subset of network traffic to at least the second spectrum.

4. The spectrum allocation controller of claim 3, wherein the one or more modules are further executable by the one or more processors to:
detect a client device operating within the first service segment; and
transmit, to the client device, control information, based at least in part on the scheduling criteria, the control information to dynamically configure use of the first spectrum for at least one of uplink transmissions or downlink transmissions of the network traffic.

5. The spectrum allocation controller of claim 4, wherein the one or more modules are further executable by the one or more processors to:
detect a change in geolocation of the client device from the first service segment to the second service segment; and
transmit, to the client device, additional control information that dynamically configures use of the second spectrum for at least one of the uplink transmissions or the downlink transmissions of the network traffic.

6. The spectrum allocation controller of claim 3, wherein the one or more modules are further executable by the one or more processors to:
identify a service priority for a client device operating within the service area; and
transmit, to the client device, control information that configures use of the first spectrum within the first service segment and the second spectrum within the second service segment, based at least in part on the service priority and the scheduling criteria.

7. The spectrum allocation controller of claim 1, wherein the one or more modules are further executable by the one or more processors to:
monitor network traffic within the service area over a predetermined time interval;
determine a QoS for instances of the network traffic that use the first spectrum and the second spectrum; and
generate a spectrum allocation data model that correlates the QoS for the instances of the network traffic with use of the first spectrum and the second spectrum, and
wherein to allocate the first subset of network traffic to at least the first spectrum and the second subset of network traffic to at least the second spectrum is based at least on the spectrum allocation data model.

8. The spectrum allocation controller of claim 1, wherein the one or more modules are further executable by the one or more processors to:
determine an available bandwidth and signal attenuation of the one or more available spectrum within the first service segment and the second service segment, and wherein, to identify the first spectrum for the first subset of network traffic and the second spectrum for the second subset of network traffic based at least in part on the available bandwidth and the signal attenuation.

9. The spectrum allocation controller of claim 1, wherein to allocate the first subset of network traffic to at least the first spectrum further includes allocating downlink transmissions of the network traffic to the first spectrum and uplink transmissions of the network traffic to the second spectrum.

10. The spectrum allocation controller of claim 1, wherein the one or more modules are further executable by the one or more processors to:
retrieve, from a data store, spectrum allocation rules associated with an allocation of available spectrum to the network traffic within the service area, and
wherein to allocation the first subset of network traffic and the second subset of network traffic is based at least in part on the spectrum allocation rules.

11. A computer-implemented method, comprising:
under control of one or more processors:
monitoring network traffic within a service area of a base station node;
determining a first quality of service (QoS) for instances of network traffic in a first service segment of the service area by employing a machine-learning algorithm to correlate real-time network traffic with historical network traffic in the first service segment to infer a first QoS based on averaged network usage data of a plurality of client devices in the first service segment;
determining a second QoS for instances of network traffic in a second service segment of the service area by employing the machine-learning algorithm to correlate real-time network traffic with historical network traffic in the second service segment to infer a second QoS based on averaged network usage data of a plurality of client devices in the second service segment;
determining whether the first QoS and second QoS for the instances of network traffic in the first service segment and second service segment, respectively, are less than a predetermined QoS threshold, and in response to such a determination:
detecting available spectrum to facilitate transmission of the network traffic within the service area;
analyzing the available spectrum relative to the network traffic to infer an allocation of at least a first spectrum for the first service segment of the service area and a second spectrum for the second service segment of the service area based on the first QoS and second QoS, respectively; and
generating scheduling criteria to allocate a first subset of network traffic to at least the first spectrum and a second subset of network traffic to at least the second spectrum, based at least in part on the analysis of the available spectrum.

12. The computer-implemented method of claim 11, further comprising:
transmitting control information to one or more client devices within the service area, based at least in part on the scheduling criteria, the control information to dynamically configure use of at least one of the first spectrum within the first service segment or the second spectrum within the second service segment.

13. The computer-implemented method of claim 11, wherein generating the scheduling criteria for the first subset of network traffic further comprises:
allocating uplink transmissions to the first spectrum and downlink transmissions to one of the second spectrum or a third spectrum that is different from the first spectrum and the second spectrum.

14. The computer-implemented method of claim 11, further comprising:
inferring a likely QoS for individual spectrum of the available spectrum; and
selecting the first spectrum and the second spectrum based at least in part on the likely QoS being equal to or greater than the predetermined QoS threshold.

15. The computer-implemented method of claim 11, further comprising:
generating a statistical model that correlates the QoS for the instances of network traffic with use of the available spectrum over a predetermined time interval, and
wherein, analyzing the available spectrum relative to the network traffic is based at least in part on the statistical model.

16. One or more non-transitory computer-readable media storing computer-executable instructions that, when executed on one or more processors, cause the one or more processors to perform acts comprising:
determining a first quality of service (QoS) associated with a first subset of network traffic of individual client devices operating within a first service segment of a service area of a base station node;
employing a machine-learning algorithm to correlate real-time network traffic with historical network traffic in the first service segment to infer whether the first QoS within the first service segment is less than a predetermined QoS threshold;
determining a second QoS associated with a second subset of network traffic of individual client devices operating within a second service segment of the service area of the base station node;
employing the machine-learning algorithm to correlate real-time network traffic with historical network traffic in the second service segment to infer whether the second QoS within the second service segment is less than the predetermined QoS threshold;
detecting available spectrum within the service area to facilitate the network traffic;
analyzing the available spectrum for spectrum having a QoS that is equal to or greater than the predetermined QoS threshold;
allocating the first subset or the second subset of network traffic to one of a first spectrum or a second spectrum of the available spectrum, based at least in part on analysis of the available spectrum and on the first QoS or the second QoS being less than the predetermined QoS threshold; and
generating scheduling criteria to allocate the first subset and second subset of network traffic to the first spectrum or the second spectrum.

17. The one or more non-transitory computer-readable media of claim 16, further comprising:

transmitting, control information to the individual client devices within the service area, based at least in part on the scheduling criteria, the control information to dynamically configure use of at least one of the first spectrum or the second spectrum.

18. The one or more non-transitory computer-readable media of claim 16, wherein generating the scheduling criteria is further to:
allocate the first subset of network traffic to the first spectrum, the first service segment extending from the base station node to a first service edge; and
allocate the second subset of network traffic to the second spectrum, the second service segment extending outward from the first service edge.

19. The one or more non-transitory computer-readable media of claim 16, wherein the network usage data includes data on uplink throughput, downlink throughput, packet loss, jitter, or latency.

20. The one or more non-transitory computer-readable media of claim 16, wherein generating the scheduling criteria is further to allocate uplink transmissions of the first subset of network traffic to the first spectrum and downlink transmissions of the second subset of network traffic to the second spectrum.

* * * * *